(12) United States Patent
Wilkes et al.

(10) Patent No.: US 12,173,775 B2
(45) Date of Patent: Dec. 24, 2024

(54) ATTACHMENT SYSTEM

(71) Applicant: Hang Free LLC, Orlando, FL (US)

(72) Inventors: Van Taylor Wilkes, Orlando, FL (US); Wyatt David Wilkes, Orlando, FL (US)

(73) Assignee: Hang Free LLC, Orlando, FL (US)

( * ) Notice: Subject to any disclaimer, the term of this patent is extended or adjusted under 35 U.S.C. 154(b) by 0 days.

(21) Appl. No.: 18/351,863

(22) Filed: Jul. 13, 2023

(65) Prior Publication Data
US 2024/0044393 A1 Feb. 8, 2024

Related U.S. Application Data

(60) Provisional application No. 63/394,384, filed on Aug. 2, 2022.

(51) Int. Cl.
*F16G 11/14* (2006.01)

(52) U.S. Cl.
CPC .................................. *F16G 11/14* (2013.01)

(58) Field of Classification Search
CPC ..... F16G 11/14; Y10T 24/3913; Y10T 24/318
See application file for complete search history.

(56) References Cited

U.S. PATENT DOCUMENTS

| | | | |
|---|---|---|---|
| 11,510,482 B2 * | 11/2022 | Holland | A45F 5/00 |
| 2008/0000719 A1 * | 1/2008 | Jones | A62B 35/0075 182/3 |
| 2011/0309617 A1 * | 12/2011 | Eley | B65H 69/04 289/1.5 |
| 2021/0215230 A1 * | 7/2021 | Howard | F16G 11/146 |

* cited by examiner

*Primary Examiner* — Robert Sandy
(74) *Attorney, Agent, or Firm* — Grossman, Tucker, Perreault & Pfleger, PLLC; Steven J. Grossman

(57) ABSTRACT

The present invention relates generally to an attachment and cinching system. More specifically, the present disclosure relates to an apparatus and method to attach objects to a stationary vertical support where such objects include a climbing stick and/or climbing tree platform.

19 Claims, 6 Drawing Sheets

ATTACHMENT SYSTEM

CROSS REFERENCE TO RELATED APPLICATIONS

This application claims the benefit of U.S. Provisional Application Ser. No. 63/394,384 filed Aug. 2, 2023, the teachings of which are incorporated herein by reference.

FIELD

The present invention relates generally to an attachment and cinching system. More specifically, the present disclosure relates to an apparatus and method to attach objects to a stationary vertical support where such objects include a climbing stick and/or climbing tree platform.

BACKGROUND

Climbers, linemen, tree cutters, saddle hunters, etc. use friction hitch knots, also referred to as "slide and grip" friction knots, for their adjustability (slide) and security (grip). Friction knots can slide relatively freely along a cord when there are no forces pulling on the knot. Under these unloaded conditions, the position of the knot is easily adjusted. However, friction knots under tension will grip the cord around which they are tied. Under these loaded conditions, a relatively greater force is needed to move the knot from its location providing security.

A cinching system may be utilized to provide restraint and tightening of a cord looped around a stationery relatively vertical support. Such a cinching system typically comprises a main cord and a tightening mechanism. Known tightening mechanisms for such cinching systems, such as mechanical ratcheting devices, can be effective for tightening and providing a cord restraint, and they are typically configured to require the user to employ both hands to tighten.

Expanding on the above, in the more particular case of prusik tightening mechanisms, which relies upon a prusik or friction hitch or knot that attaches a loop of cord around a main cord, a user is typically required to utilize two hands—one to hold the main cord and the other to push the prusik knot along the main cord. Such prusik knots are typically used by climbers, linemen, tree cutters, saddle hunters, etc., to ascend on the main cord, or as is often described, to allow the individual to prusik up on the main cord or rope to attain a desired height.

A need therefore remains to provide an improved attachment and cinching system for attachment of objects such as a climbing stick and/or climbing tree platform, to a stationary vertical object. A need also remains to provide a relatively fast, relatively smooth operating and effective cinching procedure to secure such object to the relatively vertical structure such as a tree, that can then assist the individual to gain higher access on the tree and/or to relatively safely secure a platform to the tree.

SUMMARY

A cinching assembly for a main cord or rope comprising a first looped cord configured to be engaged to the main cord or rope via a friction knot and a second looped cord having one end that is configured to be slidably engaged to the main cord or rope, the second looped cord having two extending cord portions wherein said two extending cord portions are each directly mechanically engaged to the first looped cord. The mechanically engaged first and second looped cords have a common loop portion.

A method of attaching objects to a stationary vertical support comprising supplying a cinching assembly engaged to a main cord or rope having two ends, wherein the cinching assembly includes: a first looped cord engaged to the main cord or rope via a friction knot, a second looped cord having one end that is slidably engaged to the main cord or rope, the second looped cord having two extending cord portions wherein the two extending cord portions are each directly mechanically engaged to the first looped cord, wherein the mechanically engaged first and second looped cords have a common loop portion. One then provides an object to be restrained against a vertical structure having an anchor location and secures one end of said main cord or rope to the object on said object anchor location and loops the other end of the main cord or rope around the vertical structure. This is then followed by securing the common loop portion of the cinching assembly to the anchor location on said object and pulling the other end of the main cord or rope and moving the friction knot away from said object anchor location and securing the object against the surface of said vertical structure.

DRAWINGS

Features and advantages of this disclosure will become more apparent as the following detailed description proceeds, and upon reference to the drawings, wherein like numerals designate like parts, and in which.

DETAILED DESCRIPTION OF PREFERRED EMBODIMENTS

Figure 1A:
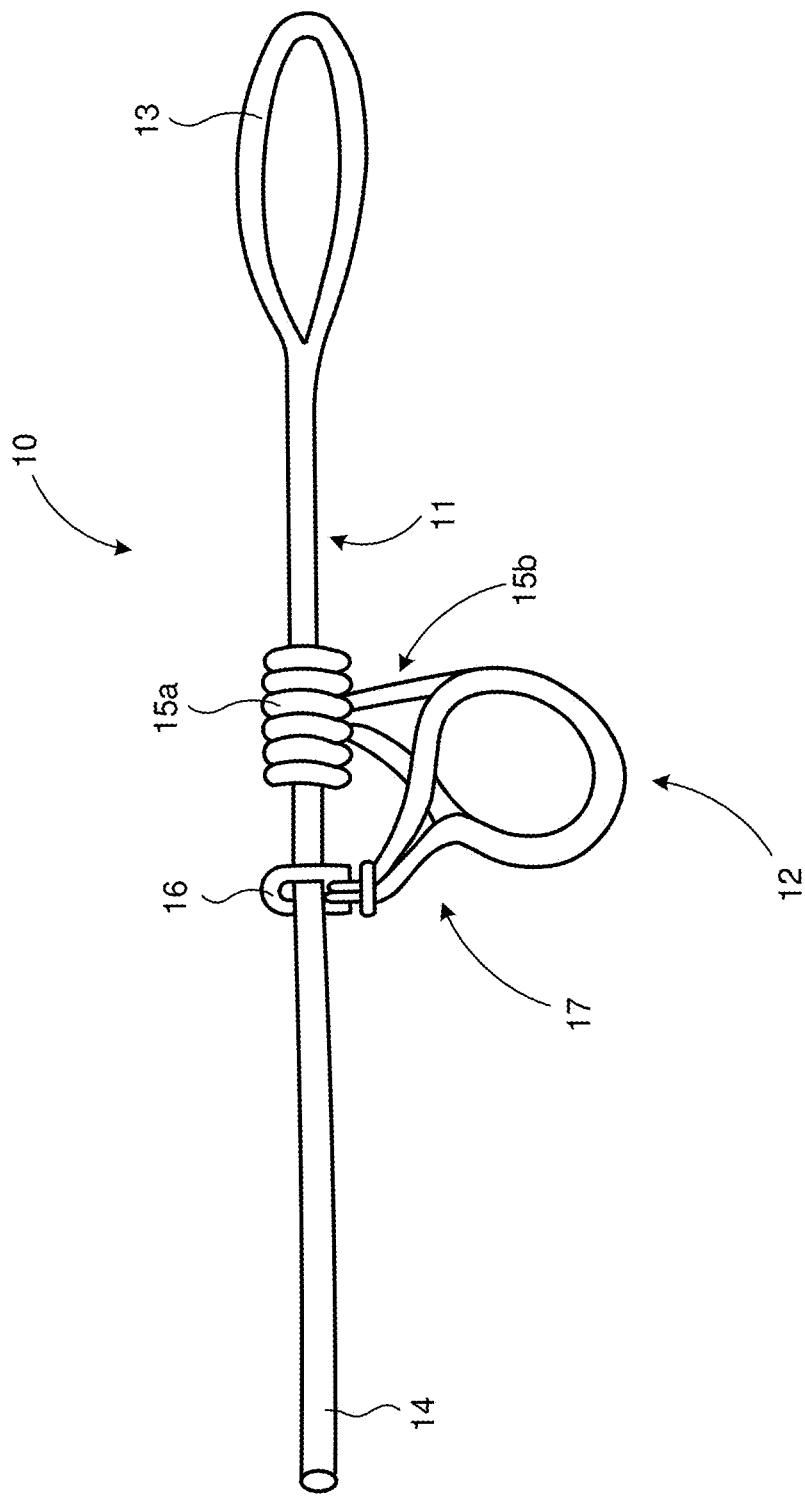
FIG. 1A is a view of an exemplary cinching system of the present disclosure as installed on a main cord or rope.

FIG. 1A depicts one preferred embodiment of the cinching system 10 which preferably includes a main cord or rope 11 and cinching assembly 12 engaged with the main cord. Main cord 11 preferably has one fixable end 13 in the form of a loop and one loose end 14. Main cord or rope 11 can be of any desired length or diameter to ultimately loop around a relatively vertical object such as a tree. Accordingly, main cord or rope 11 preferably has a diameter in the range of 3.0 mm to 10.0 mm and a length in the range of 4.0 feet to 20.0 feet. Main cord or rope 11 can preferably be selected from polyamide (nylon), polyester, aramid fibers such as Kevelar®, polyethylene or polypropylene.

Cinching assembly 12, preferably comprises a first looped cord 15 and second looped cord 17. Second looped cord 17 is engaged to a ring plate 16, where the ring plate is engaged to and in sliding engagement with the main cord or rope 11. Accordingly, a ring plate herein is to be understood as any device to engage with two rope portions and to allow for slidingly engage along one of the rope portions. The ring plate 16 may therefore be, as shown, in the form of what is often described as a D-ring plate. Both the first looped cord 15 and the second looped cord 17 are also preferably made of fibrous material that is also preferably selected from polyamide (nylon), polyester, aramid fibers such as Kevelar®, polyethylene or polypropylene. As can also be seen in FIG. 1A, first looped cord 15 is engaged to main cord or rope 11 via use of a friction knot 15a which as shown is preferably in the form of a prusik or friction hitch or knot.

Figure 1B:
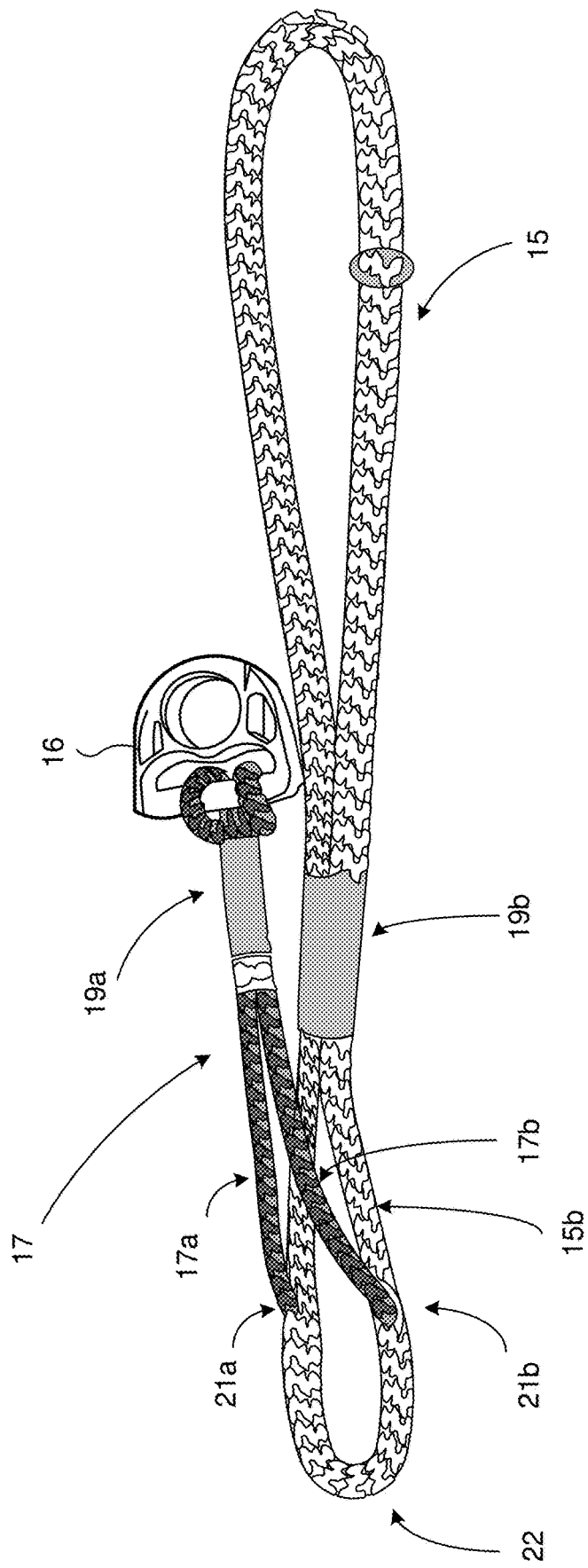
FIG. 1B is a view of an exemplary cinching system.

FIG. 1B provides an expanded view of the cinching assembly 12, having a first looped cord 15 and second looped cord 17. In this view, the first looped cord is not yet engaged to the main cord or rope 11 via a friction knot or prusik hitch or knot. A friction knot is understood as a knot that frictionally engaged with the main cord or rope. As may be appreciated, the first looped cord is therefore preferably engaged to the main cord or rope by tying what is known as a Girth Hitch around the main cord or rope 11 and passing the loop of the cord 15 back and through the center of the Girth Hitch three or four times. Such will then provide the preferred prusik hitch. In addition, one can similarly attach the second loop cord 17 to the ring plate 16 with a Girth Hitch. One may also preferably position and apply heat-shrink tubing at locations 19a and 19b.

As also illustrated in FIG. 1B, the two extending cord portions 17a and 17b of second looped cord 17 are directly engaged to the first looped cord 15 at locations 21a and 21b. By directly engaged, it is reference to the feature that the first and second looped cords 15 and 17 are engaged to one other without the separate use of a mechanical attachment device, such as a carabiner or other mechanical rope connecting device.

More preferably, at locations 21a and 21b, the first looped cord 15 and second looped cord 17 are directly mechanically engaged to one another, which can be achieved in several ways. Preferably, residual second loop portion 15b is configured so that end portions 17a and 17b of the second loop 17 fit within residual loop portion 15b. In other words, a portion of the second loop 17 enters into and within first loop portion at location 21a and preferably proceeds within and around what is identified as common loop portion 22 and emerges at location 21b. It is also worth noting that with respect to second looped cord 17, as noted, it includes two cord portions 17a and 17b, which preferably are of equal length as they extend to entry and exit location points 21a and 21b. Accordingly, a portion of second loop 17 fits within a portion of first loop 15 and defines the common loop portion 22, providing a direct mechanical engagement of the second loop 17 to the first loop 15, without the use of any additional mechanical attachment device.

It is also contemplated that direct mechanical engagement of the first looped cord 15 and second looped cord 17 may be achieved by sewing or weaving first looped cord 15 and second looped cord 17 together at locations 21a and 21b. It is also contemplated that direct mechanical engagement of the first looped cord 15 and second looped cord 17 may be achieved by mechanical interlocking and entanglement of the respective fibers of individual end portions 17a and 17b to the first loop 15, optionally with the use of an adhesive.

Figure 2:
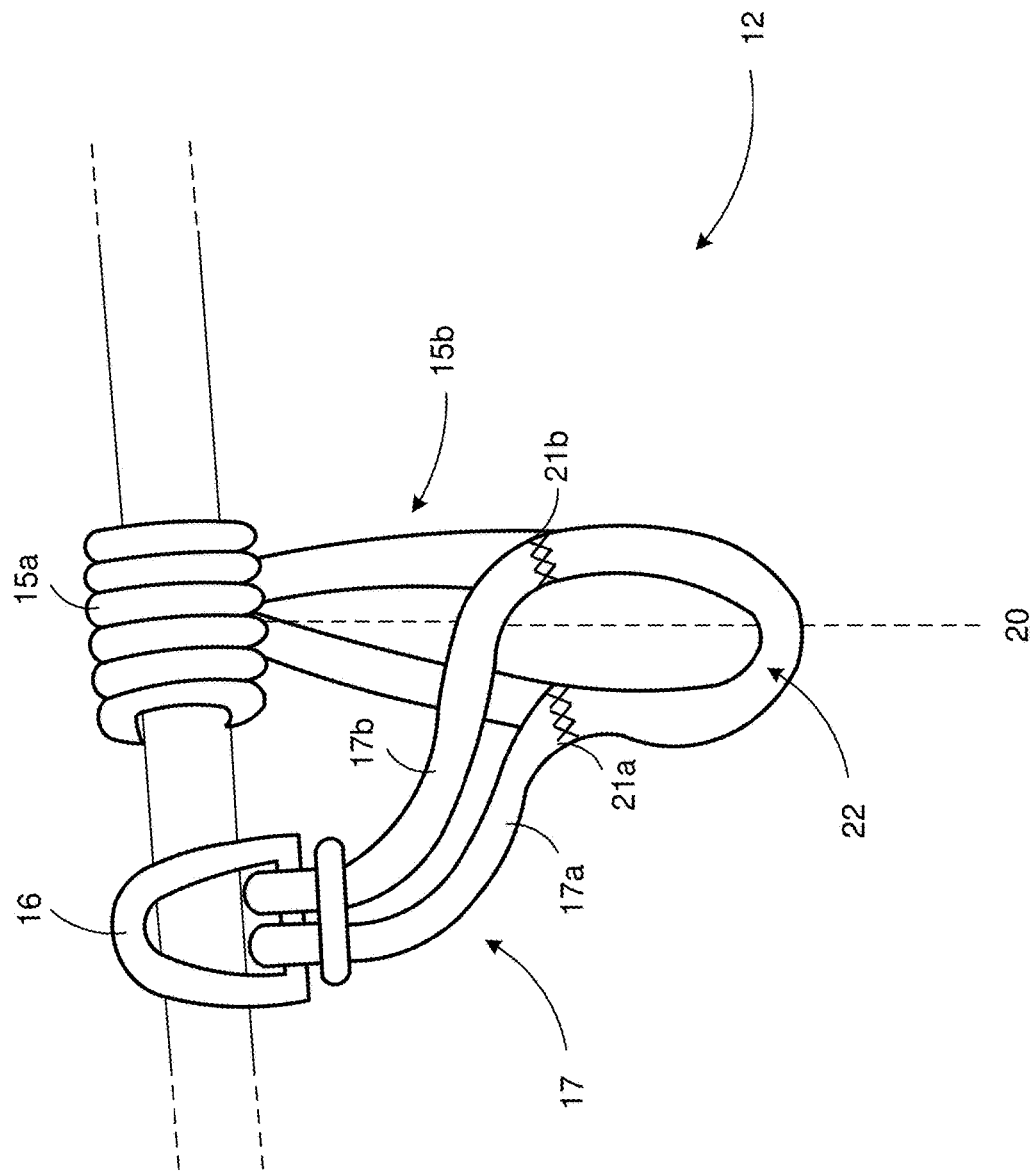
FIG. 2 illustrates the friction knot assembly of the cinching system of FIG. 2 in a close-up view.

As can now be more fully appreciated from FIG. 2, which is an expanded view of FIG. 1A, first looped cord 15 as noted preferably includes on one end a friction knot 15a that is engaged to the main cord along with the noted residual loop portion 15b extending from friction knot 15a. The second looped cord 17 is connected at one end to ring 16, where the ring is slidably engaged to the main cord or rope 12. Ring 16 can assume any geometry (e.g. square, rectangle, circle, polygon, etc.). First looped cord 15 preferably has a diameter in the range of 2.0 mm to 9.0 mm, and second looped cord 17 preferably had a diameter in the range of 1.0 mm to 5.0 mm.

In FIG. 2, it can again be seen that the first looped cord 15 and the second looped cord 17 are then directly engaged to one another via a common loop portion 22, wherein as noted, a portion of the second looped cord 17 fits within a portion of the first looped cord 15. Again, the second looped cord 17 has two extending end portions 17a and 17b which are directly mechanically engaged to the first looped cord 15 and enter into the first loop cord 15 at two entry/exit locations, 21a and 21b. Such locations are also preferably on either side of a centerline 20 of the first loop cord 15. In addition, when the first looped cord 15 and second looped cord 17 are joined together as described herein, as noted, they define a common loop portion 22 where the first looped cord 15 and second loop cord 17 may optionally be sewn together along all or a portion of a common loop portion 22. The common loop portion 22 itself between locations 21a and 21b preferably has a length in the range of 0.5 inches to 10.0 inches.

Figure 3A:
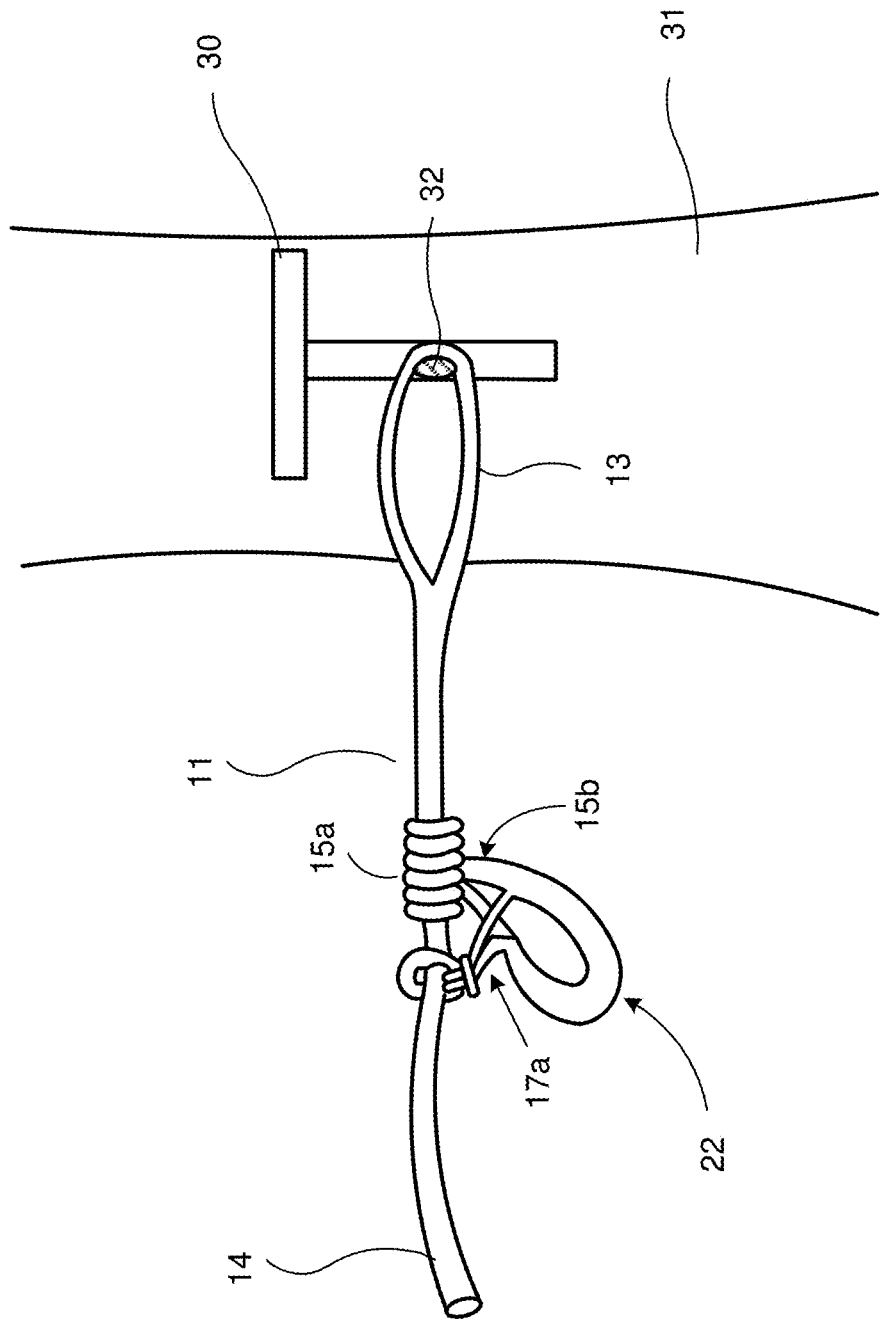
FIGS. 3A-3C illustrate the cinching system of FIG. 1 as it is used to secure a tree stand to a tree.
Figure 3B:
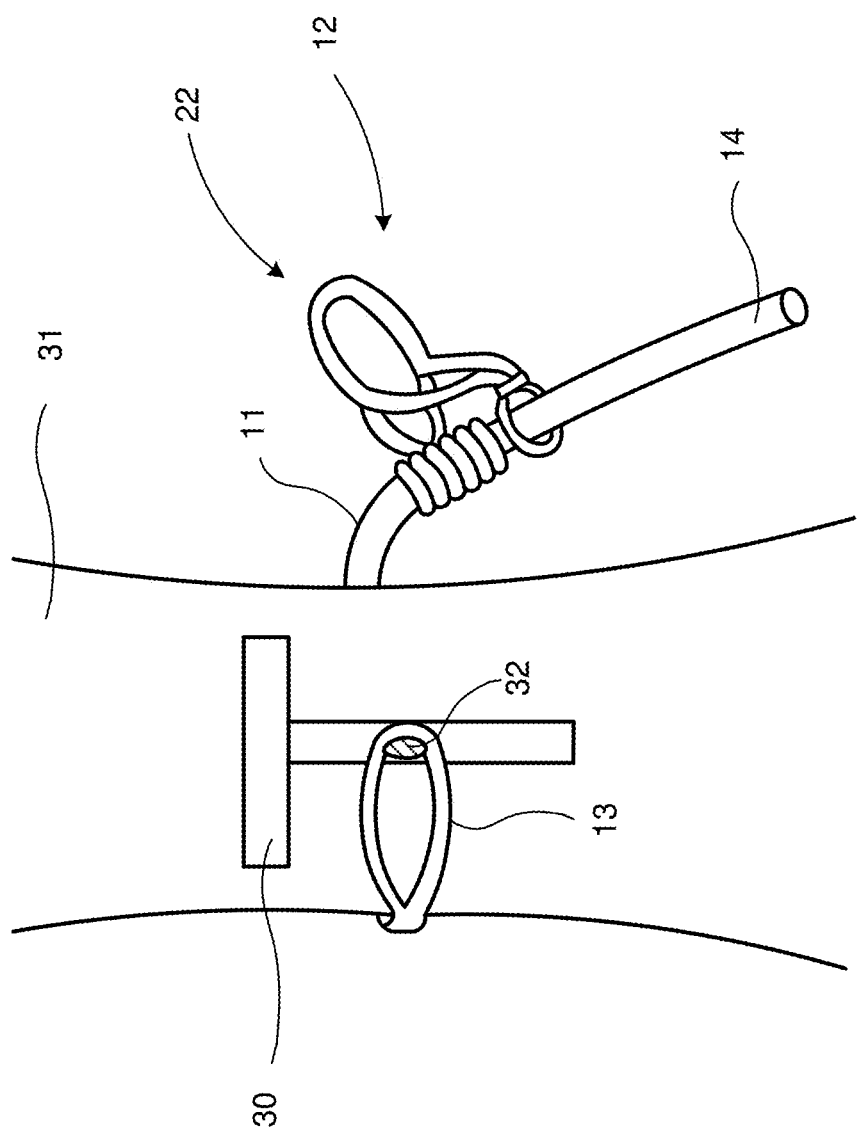
Figure 3C:
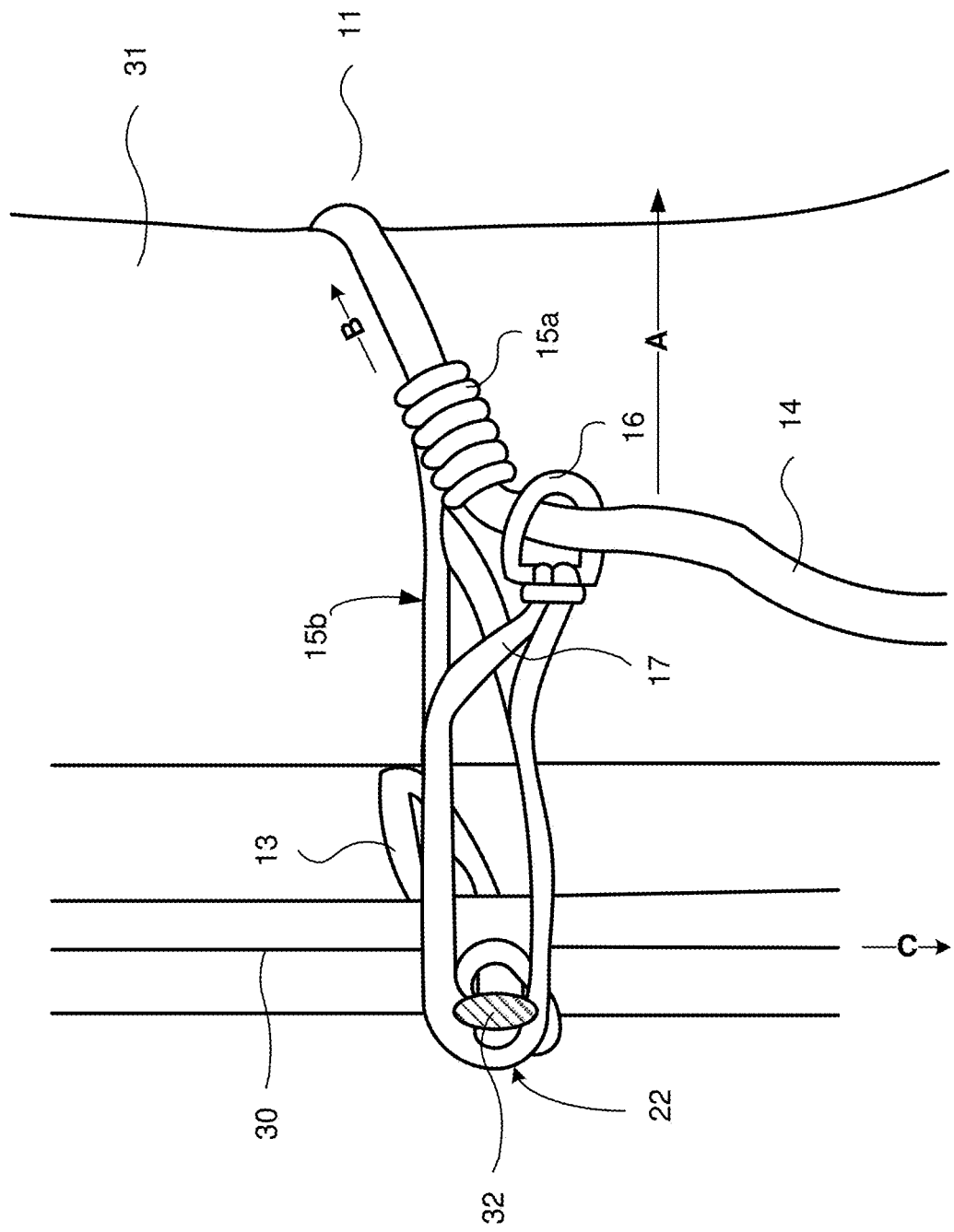

FIGS. 3A-3C next depict the preferred embodiment of FIGS. 1A, FIG. 1B and FIG. 2, as it cinches and secures an exemplary object 30 to the tree 31. In FIG. 3A, the object 30 depicts a tree stand that is initially held by the user with one hand against tree 31. As noted above, object 30 may also include a climbing stick which is relied upon to allow the user to scale the tree. While the cinching system is being installed to support and restrain tree stand 30 against tree 31, the user therefore preferably holds the tree stand 30 in place with one hand against the surface of tree. In the preferred embodiment shown in FIG. 3A, fixable and preferably looped end 13 of the main cord or rope 11 may then be hooked onto an anchor location such as a protruding peg 32 on tree stand 30. As next shown in FIG. 3B, the loose end 14 of the main cord or rope 11 is now wrapped around the tree 31 and the cinching assembly 12 now is brought into position so that it is proximate to a location on the tree stand 30 so that common loop portion 22 can also ultimately be engaged and anchored on protruding peg 32 on object 30.

In FIG. 3C common loop portion of the cinching assembly 12 is now engaged to anchor location 32. A user may then with the other hand pull the main cord or rope in the general direction shown by arrow A away from anchor location which will then result in the movement (e.g. sliding) of friction knot 15a along the main cord or rope 11 in the direction of arrow B. This causes main cord or rope 11 now looped around the tree 31 to reduce in its circumference and to immobilize and restrain object 30 (e.g. a tree stand) against the surface of the tree. In addition, the friction knot 15a when moved in the direction of arrow B, and further away from anchor location 32, is placed in tension in that the restraining forces due to the stretching of residual loop portion 15b can serve to tighten friction knot 15a onto the main cord or rope 11. In addition, to further secure the object 30 onto the tree 31, the user may pull the object 30 downwardly in arrow direction C. The overall result then is that a user can relatively conveniently cinch and secure a stationary object to a vertical object via use of the aforementioned cinching system, which is preferably achieved by only one hand operation via pulling one end of the main cord or rope 11. The object is then secured onto the tree and is capable of supporting the weight of an individual and is therefore capable of supporting a weight in the range of 100 pounds to 750 pounds.

In addition, and again with reference to FIG. 3C, the tightening and cinching mechanism noted above can be readily reversed by the user. Namely, once the main core or rope 11 is cinched and tensioned onto the tree 31 to restrain and support an object such as a climbing stick or tree stand, the user can readily remove such object from its restrained position by pulling rope 14 in the direction opposite to direction A. This then relieves the tension and causes the circumferential size of the main cord or rope 11 to expand a relatively small amount, so that end 14 may be fed back through ring 16 and the object 30 is then conveniently removed from the tree 31.

As may therefore now be appreciated, the attachment system herein preferably allows for single hand operation and relatively smooth operation that provides for single hand tensioning and securing of a selected object to a vertical structure. The attachment system preferably consists of one friction knot (e.g., prusik) and avoids the use of multiple friction knots on the main cord or rope. The attachment system also avoids the use of separate mechanical attachment device to connect the first and second looped cords of the above-described cinching assembly.

LIST OF REFERENCE CHARACTERS

10 cinching system
11 main cord or rope
12 cinching assembly
13 fixable end/loop
14 loose end
15 first looped cord
15*a* friction knot
15*b* residual second loop portion
16 rigging plate
17 second looped cord
17*a*, 17*b* extending portions of the second looped cord
20 residual loop centerline
21*a*, 21*b* attachment location points
22 common loop portion
30 object (e.g. tree stand)
31 tree
32 protruding peg

What is claimed is:

1. A cinching assembly for a main cord or rope, comprising:
   a. a first looped cord configured to be engaged to said main cord or rope via a friction knot;
   b. a second looped cord having one end that is configured to be slidably engaged to said main cord or rope, said second looped cord having two extending cord portions wherein said two extending cord portions are each directly mechanically engaged to said first looped cord; and
   c. wherein said mechanically engaged first and second looped cords have a common loop portion.

2. The cinching assembly of claim 1 wherein a portion of said second looped cord fits within a portion of said first looped cord and forms said common loop portion.

3. The cinching assembly of claim 1 wherein said two extending cord portions of said second looped cord are woven together at two or more locations on said first looped cord.

4. The cinching assembly of claim 1 wherein said first looped cord includes a friction knot comprising a prusik hitch.

5. The cinching assembly of claim 1 wherein said second looped cord includes a ring plate for sliding engagement to said main cord.

6. The cinching assembly of claim 5 wherein said second looped cord is engaged to said ring plate by a Girth Hitch.

7. The cinching assembly of claim 1, further including a main cord or rope, wherein one end of said first looped cord of said cinching assembly is engaged to said main cord or rope via a friction knot and wherein one end of said second looped cord of said cinching assembly is slidably engaged to said main cord or rope.

8. The cinching assembly of claim 1 wherein said first looped cord and said second looped cord are composed of polyamide, polyester, aramid fiber, polyethylene or polypropylene.

9. The cinching assembly of claim 1 wherein said first looped cord has a diameter in the range of 2.0 mm to 9.0 mm.

10. The cinching assembly of claim 1 wherein said second looped cord has a diameter in the range of 1.0 mm to 5.0 mm.

11. A method of attaching objects to a stationary vertical support, comprising:
   a. supplying a cinching assembly engaged to a main cord or rope having two ends, wherein said cinching assembly includes:
      i. a first looped cord engaged to said main cord or rope via a friction knot;
      ii. a second looped cord having one end that is slidably engaged to said main cord or rope, said second looped cord having two extending cord portions wherein said two extending cord portions are each directly mechanically engaged to said first looped cord; and
      iii. wherein said mechanically engaged first and second looped cords have a common loop portion;
   b. providing an object to be restrained against a vertical structure having an anchor location;
   c. securing one end of said main cord or rope to said object on said object anchor location;
   d. looping the other end of said main cord or rope around said vertical structure and then securing said common loop portion of said cinching assembly to said anchor location on said object; and
   e. pulling said other end of said main cord or rope and moving said friction knot away from said object anchor location and securing said object against the surface of said vertical structure.

12. The method of claim 11 wherein a portion of said second looped cord fits within a portion of said first looped cord and forms said common loop portion.

13. The method of claim 11 wherein said two extending cord portions of said second looped cord are woven together at two or more locations on said first looped cord.

14. The method of claim 11 wherein said first looped cord includes a friction knot comprising a prusik hitch.

15. The method of claim 11 wherein said second looped cord includes a ring plate for sliding engagement to said main cord.

16. The method of claim 15 wherein said second looped cord is engaged to said ring plate by a Girth Hitch.

17. The method of claim 11 wherein said first looped cord and said second looped cord are composed of polyamide, polyester, aramid fiber, polyethylene or polypropylene.

18. The method of claim 11 wherein said first looped cord has a diameter in the range of 2.0 mm to 9.0 mm.

19. The method of claim 11 wherein said second looped cord has a diameter in the range of 1.0 mm to 5.0 mm.

\* \* \* \* \*